(12) United States Patent
Schmidt

(10) Patent No.: US 6,264,038 B1
(45) Date of Patent: Jul. 24, 2001

(54) METHOD AND APPARATUS FOR WASTE PROCESSING WITH MULTISTAGE SEPARATION BY AIR CLASSIFICATION OF LIGHT FRACTIONS FROM DRIED MATERIAL

(75) Inventor: Hans Schmidt, Liebenburg (DE)

(73) Assignee: R.S.T. Luxembourg SA, Luxembourg (LU)

( * ) Notice: Subject to any disclaimer, the term of this patent is extended or adjusted under 35 U.S.C. 154(b) by 0 days.

(21) Appl. No.: 09/458,345

(22) Filed: Dec. 10, 1999

(30) Foreign Application Priority Data

Jan. 4, 1999 (EP) .................................................. 99630004

(51) Int. Cl.⁷ ............................... B03B 1/00; B03B 7/00; B03C 1/30; B02C 1/00
(52) U.S. Cl. ............................ 209/3; 241/19; 209/139.1; 209/142; 209/138; 209/39; 209/12.1
(58) Field of Search .................. 241/19, 79.1; 209/139.1, 209/142, 3, 12.1, 39, 138

(56) References Cited

U.S. PATENT DOCUMENTS

| | | | | |
|---|---|---|---|---|
| 1,934,410 | * | 11/1933 | Cummins | 209/39 |
| 2,126,672 | * | 8/1938 | Dmith et al. | 241/19 |
| 3,294,236 | * | 12/1966 | Lagarias | 241/19 |
| 3,311,234 | * | 3/1967 | Rumpf et al. | 241/19 |
| 3,749,322 | * | 7/1973 | Reynolds | 209/3 |
| 3,802,558 | * | 4/1974 | Rhys | 209/557 |
| 3,848,813 | * | 11/1974 | Stanczyk et al. | 241/19 |
| 3,885,744 | * | 5/1975 | Drage | 241/23 |
| 3,951,731 | * | 4/1976 | Jetzer | 162/5 |
| 4,065,282 | * | 12/1977 | Morey | 65/28 |
| 4,134,731 | * | 1/1979 | Houser | 195/127 |
| 4,586,659 | * | 5/1986 | Easter, II | 241/23 |
| 4,623,515 | * | 11/1986 | Frei et al. | 422/1 |
| 4,640,768 | * | 2/1987 | Morbioli et al. | 209/37 |
| 4,746,421 | * | 5/1988 | Turbitt | 209/3 |
| 4,815,668 | * | 3/1989 | Frei | 241/23 |
| 5,184,780 | * | 2/1993 | Weins | 241/19 |
| 5,253,813 | * | 10/1993 | Belliveau et al. | 241/19 |
| 5,826,807 | * | 10/1998 | Csendes | 241/19 |
| 5,890,663 | * | 4/1999 | Strach et al. | 241/19 |
| 5,921,481 | * | 7/1999 | Nakamura et al. | 241/39 |

* cited by examiner

*Primary Examiner*—Donald P. Walsh
*Assistant Examiner*—Daniel K Schlak
(74) *Attorney, Agent, or Firm*—Thomas S. Baker, Jr.

(57) ABSTRACT

To separate light organic fractions from waste which has undergone pretreatment consisting of precomminution, ferrous-metal separation, postcomminution, further ferrous-metal separation, drying and nonferrous-metal separation, multiple, preferably so-called zigzag air classifiers are arranged in cascading stages and are passed through sequentially by the material stream to be separated. The upward-stream speed of the air is adjusted in stages in the individual air classifiers such that the first air classifier receives the smallest and the last air-classifier the highest air speed. As a result, first the fine, then the medium and lastly the large organic light fractions are discharged to the top in sequence from each air-classifier stage. The separated organic light fractions represent fuel components of high calorific value. The remaining bottom-discharge from the air classifier group consists of a mixture of heavy organic fractions and minerals. This material mixture is separated by ballistic density separation into a heavy organic fraction and minerals. The separated heavy organic fraction also represents fuel components of high calorific value. The noncombustible groups such as ferrous metals, nonferrous metals, water and minerals collected throughout the entire process are utilizable as raw recycling materials.

16 Claims, 2 Drawing Sheets

METHOD AND APPARATUS FOR WASTE PROCESSING WITH MULTISTAGE SEPARATION BY AIR CLASSIFICATION OF LIGHT FRACTIONS FROM DRIED MATERIAL

BACKGROUND OF THE INVENTION

This invention concerns a method for processing waste with multistage air classification of light fractions from dried material, as well as a device to implement this method.

The organic material groups in waste are fractions of high calorific value from which fuels may be obtained. The organic material groups consist essentially of light (dispersible) and heavy (granular) fractions which may then be sorted, depending on waste source and application, into coarse (approx. <10 mm), fine (approx. >2 mm–10 mm) and superfine (<2 mm) fractions.

In order to obtain pollutant-free, i.e. the cleanest possible fuels from waste, it is necessary to separate the waste, after suitable pretreatment, into specific material groups and separate out the organic fractions of high calorific value. This is usually achieved using air-classification equipment.

Methods of this kind are described, among others, in
DE-PS 31 05 597
FP-PS 02 43 747 B1
U.S. Pat. No. 4,623,515
U.S. Pat. No. 4,815,668

To separate out the light organic fractions, the known methods require a combination of upstream screening before air classification in order to achieve a sufficiently high degree of separation between the light and heavy particles through air classification of the sorted particle-size groups. Air classification of all particle sizes together results in insufficient degrees of separation. This combined procedure is relatively complex and entails high installation costs of technical implementation.

The task of the invention is to avoid the disadvantages described of high technical complexity and cost for the air classification of light fractions from the waste mixtures and to simplify the air classification process.

SUMMARY OF THE INVENTION

This invention fulfills this task by subjecting the material to be air-classified to the preliminary steps of precomminution, ferrous-metal separation, postcomminution and drying, and subsequently moving it into two or more cascading, sequentially-arranged air classification stages through which it passes sequentially.

The air speeds of the individual air classification stages are individually adjustable so that, appropriately, the first air-classification stage has the lowest air speed and the last air-classification stage, the highest. This arrangement and adjustment of the systems facilitates the process in which, as the material passes through the air-classification stages sequentially, first the fine light fractions, and in the subsequent stages, the coarser light fractions are separated out.

The heavy, nondispersible and granular material fractions pass downward through all air-classification stages and are discharged at the bottom. They then undergo an additional density separation and are separated into a high-calorific-value organic fraction and an inorganic mineral fraction.

DESCRIPTION OF THE DRAWINGS

The following description along with the flow-chart serves to explain the invention.

DETAILED DESCRIPTION

Figure 1:
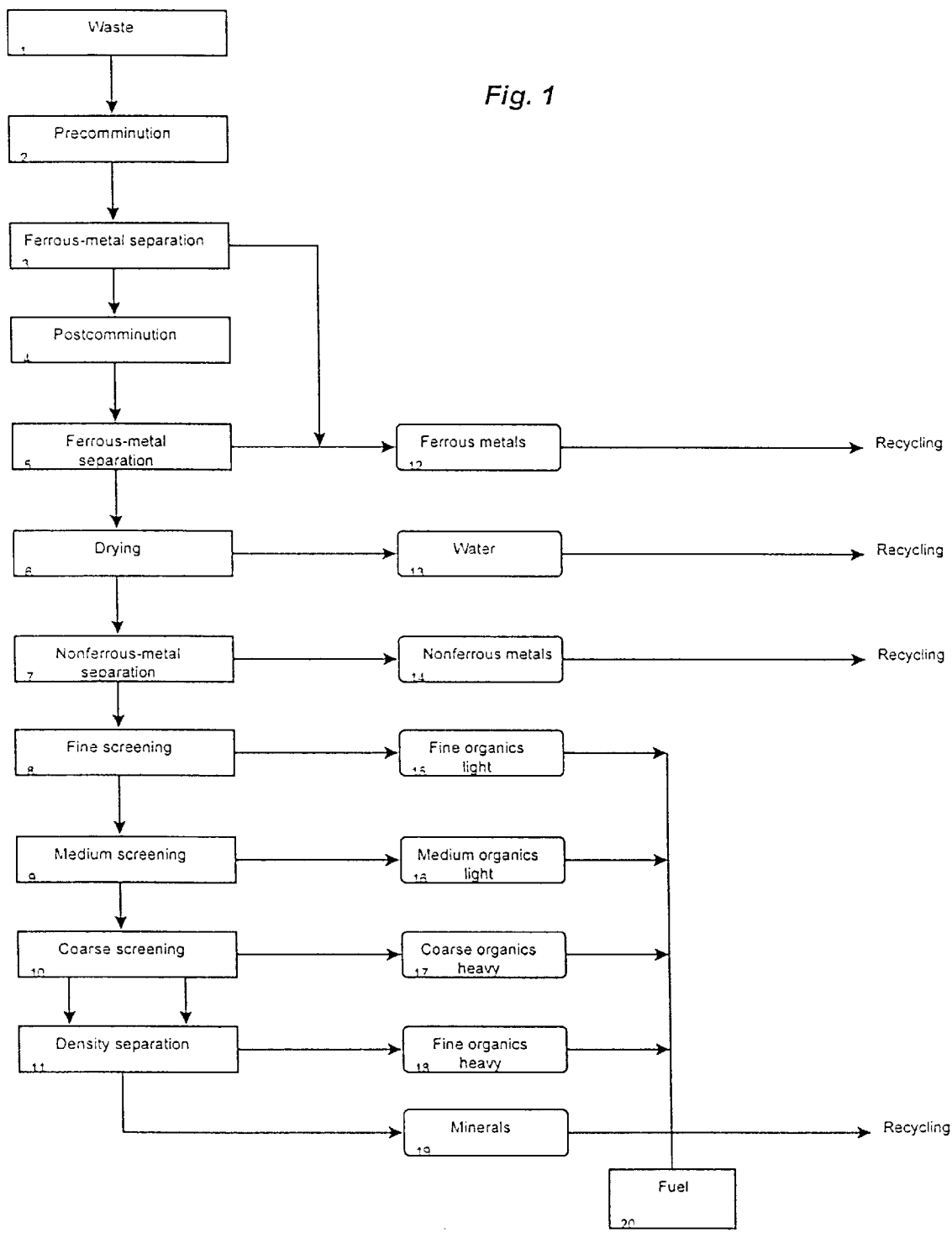

FIG. 1 illustrates the integration of the multistage air classification of light fractions from pretreated, dried waste material. Here the waste (1), in order to prepare it for air classification, undergoes the pretreatment stages of precomminution to approx. 80 mm (2), ferrous-metal separation (3), postcomminution to approx. 40 mm (4), a second ferrous-metal separation (5), drying (6) and nonferrous-metal separation.

Figure 2:
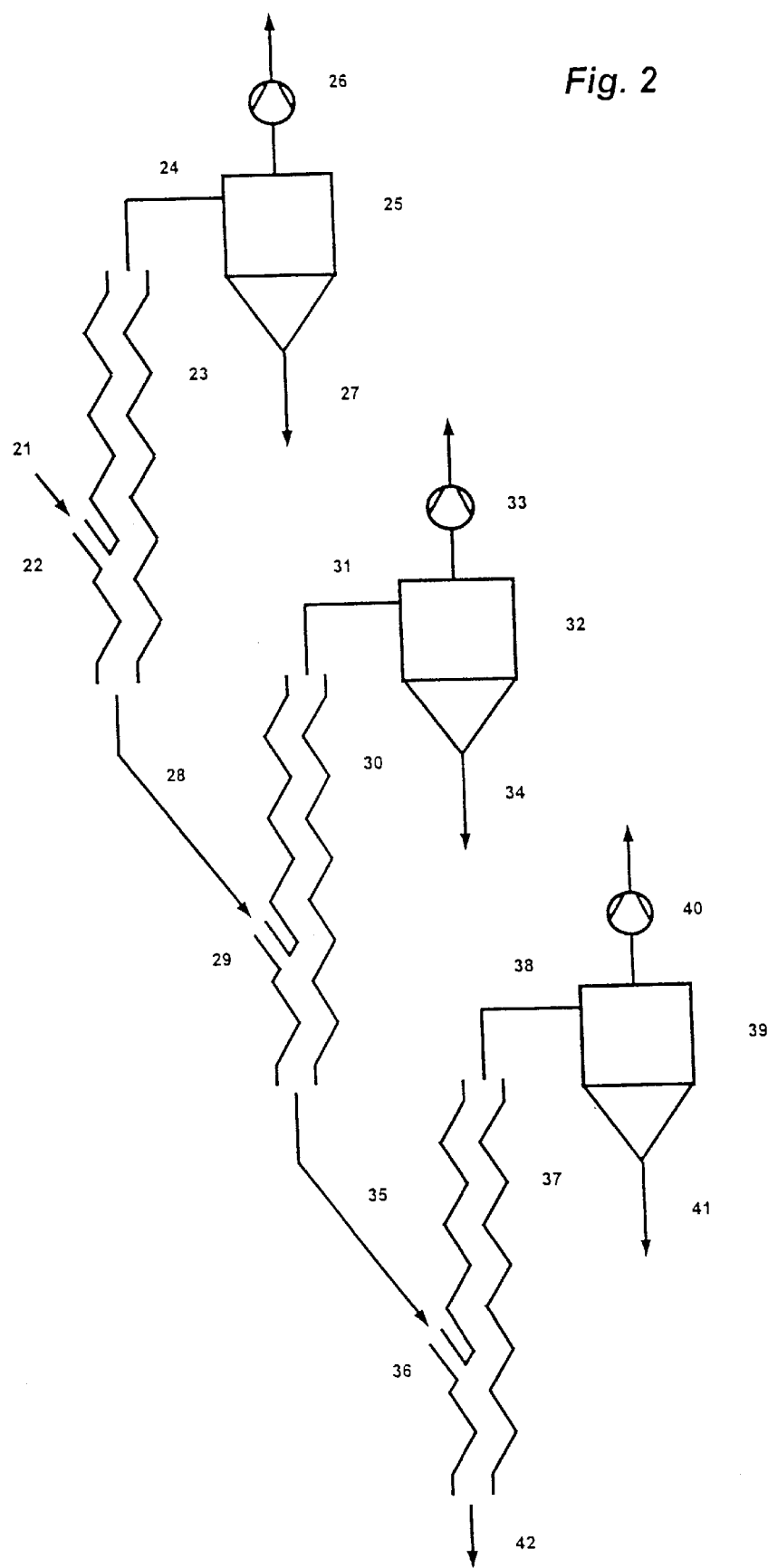

The material thus prepared (21) is now fed with its entire particle-size spectrum of 0 mm to approx. 40 mm through the inlet opening (22) of the first air classifier (23), without the usual and complex multiple screening, into the cascading air-classification stages (23, 30, 37) according to the invention, as shown in FIG. 2. The preferred air classifiers used are preferably commercially available air classifiers whose function and separation efficiency is well known.

An adjustable air speed is generated in the air classifiers by the suction aspirators (26, 33, 40) through the cyclones (26, 33) and suction ducts (24, 31, 38) which speed is adjusted such that in the first air classifier (23) the fine dispersible particles having a particle-size range of 0 mm–2 mm are separated towards the top and discharged through the suction channel (24), the cyclone (25) and the outlet (27). The fine light fraction discharged at the top (15) consists of organic material groups and represents a fuel component of high calorific value. The material settling to the bottom (28) from the first air classifier (23) contains all heavy materials as well as light fractions of a particle size greater than approx. 2 mm.

The material stream (28) is fed into the inlet opening (29) of the second air-classifier (30). In the second air-classifier (30), the air speed is set at a relatively higher level so that the medium-sized dispersible particles with a particle size of approx. 2 mm–10 mm are separated towards the top and discharged through the suction duct (31), the cyclone (32) and the outlet (34). The medium light fraction discharged at the top (16) consists of organic material groups and represents a fuel component of high calorific value.

The material settling to the bottom (35) from the second air classifier (30) contains all heavy materials as well as remaining light fractions of a particle size grater than approx. 10 mm.

The material stream (35) is fed into the inlet opening (36) of the third air classifier (37). In the third air classifier (37), the air speed is set at a high enough level so that the large dispersible particles with a particle size of > approx. 10 mm are separated towards the top and discharged through the suction duct (38), the cyclone (39) and the outlet (41). The coarse light fraction discharged at the top (17) consists of organic material groups and represents a fuel component of high calorific value. The residual material stream emanating at the bottom (42) from the third air classifier (37) consists finally of only heavy granular materials such as organic hard materials with a density of approx. 1.2 g–2.0 g/cm$^3$ and minerals with a density of approx. 2.0 g–3.5 g/cm$^3$. The heavy granular material stream (42) is subsequently separated into heavy organic materials (18) and the even heavier minerals (19) by means of a known ballistic density separation (11) with a density cut of approx. 2.0 g/cm$^3$.

The separated heavy organic materials (18) also represent a fuel component of high calorific value.

The high-calorific-value fuel components obtained, consisting of the fine organic light fraction with a particle size of 0 mm to approx. 2 mm (15), of the medium organic light fraction with a particle size of approx. 2 mm–10 mm (16), of the coarse organic light fraction with a particle size of > approx. 10 mm (17) and of the organic heavy fraction (18), are available for thermal utilization such as industrial firing, pyrolysis, thermolysis, degasification/gasification etc. in the form of pollutant-free and relatively clean, as well as storable and transportable fuel.

The other separated material groups such as ferrous metals (12), nonferrous metals (14), water (13) and minerals (19) are usable as raw recycling materials in industrial processes.

The advantages achieved by the invention consist specifically in the fact that through the cascading, staged arrangement of the air classifiers, the organic light fractions may be obtained sequentially according to their weight classes from the material mixture of pretreated and dried waste with a high degree of separation while avoiding upstream screening stages.

I claim:

1. Method for processing waste with multistage air classification of light fractions from dried material in which the waste is subject to pretreatment by comminution, ferrous-metal separation, drying, and nonferrous-metal separation, characterized by the fact that the pretreated material passes sequentially through several cascading, sequentially-arranged air classifiers and then first the fine, then the medium and finally the coarse dispersible light fractions are separated in sequence by varying air speeds.

2. Method according to claim 1, characterized by the fact that the air speeds in preferably three sequentially-arranged air classifiers are adjusted differently so that in the first air classifier only the light fractions with a particle size of 0 mm to approx. 2 mm, in the second air classifier only the light fractions with a particle size of approx. 2 mm to 10 mm, and in the third air classifier the remaining light fraction with a particle size of > approx. 10 mm is discharged to the top.

3. Method according to claim 2, characterized by the fact that the material settling to the bottom from the sequentially-arranged air classifiers in each case is fed into the next air classifier as feed material to undergo further separation of the respective dispersible light fraction.

4. Method according to claim 3, characterized by the fact that the heavy material settling to the bottom from the last air classifier is subsequently treated by ballistic separation with a density cut of approx. 2.0 g/cm$^3$, during which the minerals are separated from the lighter heavy material.

5. Device for implementing the method according to claim 4, characterized by the fact that the air classifier stages are arranged such that the lower heavy-material outlet of the air classifiers is connected with the feed-material inlet of each downstream air classifier, thereby forming the cascading, staged arrangement of the air-classifiers.

6. Device for implementing the method according to claim 3, characterized by the fact that the air classifier stages are arranged such that the lower heavy-material outlet of the air classifiers is connected with the feed-material inlet of each downstream air classifier, thereby forming the cascading, staged arrangement of the air-classifiers.

7. Method according to claim 2, characterized by the fact that the heavy material settling to the bottom from the last air classifier is subsequently treated by ballistic separation with a density cut of approx. 2.0 g/cm$^3$, during which the minerals are separated from the lighter heavy material.

8. Device for implementing the method according to claim 7, characterized by the fact that the air classifier stages are arranged such that the lower heavy-material outlet of the air classifiers is connected with the feed-material inlet of each downstream air classifier, thereby forming the cascading, staged arrangement of the air-classifiers.

9. Device for implement the method according to claim 2, characterized by the fact that the air classifier stages are arranged such that the lower heavy-material outlet of the air classifiers is connected with the feed-material inlet of each downstream air classifier, thereby forming the cascading, staged arrangement of the air-classifiers.

10. Method according to claim 1, characterized by the fact that the material settling to the bottom from the sequentially-arranged air classifiers in each case is fed into the next air classifier as feed material to undergo further separation of the respective dispersible light fraction.

11. Method according to claim 10, characterized by the fact that the heavy material settling to the bottom from the last air classifier is subsequently treated by ballistic separation with a density cut of approx. 2.0 g/cm$^3$, during which the minerals are separated from the lighter heavy material.

12. Device for implementing the method according to claim 11, characterized by the fact that the air classifier stages are arranged such that the lower heavy-material outlet of the air classifiers is connected with the feed-material inlet of each downstream air classifier, thereby forming the cascading, staged arrangement of the air-classifiers.

13. Device for implementing the method according to claim 10, characterized by the fact that the air classifier stages are arranged such that the lower heavy-material outlet of the air classifiers is connected with the feed-material inlet of each downstream air classifier, thereby forming the cascading, staged arrangement of the air-classifiers.

14. Method according to claim 1, characterized by the fact that the heavy material settling to the bottom from the last air classifier is subsequently treated by ballistic separation with a density cut of approx. 2.0 g/cm$^3$, during which the minerals are separated from the lighter heavy material.

15. Device for implementing the method according to claim 14, characterized by the fact that the air classifier stages are arranged such that the lower heavy-material outlet of the air classifiers is connected with the feed-material inlet of each downstream air classifier, thereby forming the cascading, staged arrangement of the air-classifiers.

16. Device for implementing the method according to claim 1, characterized by the fact that the air classifier stages are arranged such that the lower heavy-material outlet of the air classifiers is connected with the feed-material inlet of each downstream air classifier, thereby forming the cascading, staged arrangement of the air-classifiers.

* * * * *